No. 704,169. Patented July 8, 1902.
F. O. ANDREWS.
POTATO DIGGING MACHINE.
(Application filed Oct. 25, 1901.)
(No Model.) 3 Sheets—Sheet 1.
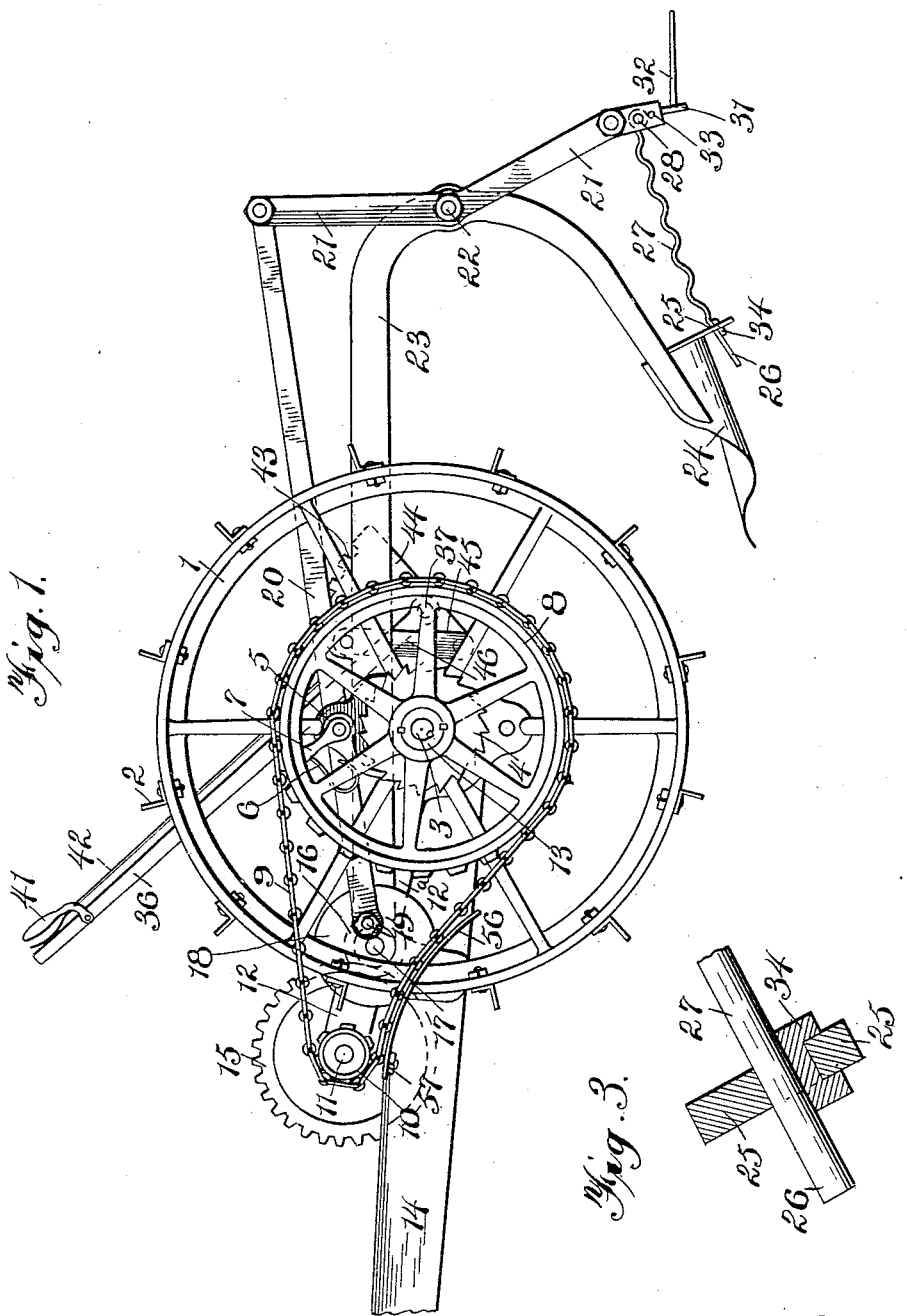
Witnesses
Geo. E. Frech
C. S. Middleton
Inventor
Frank O. Andrews.
By Richards & Co.
Attorneys

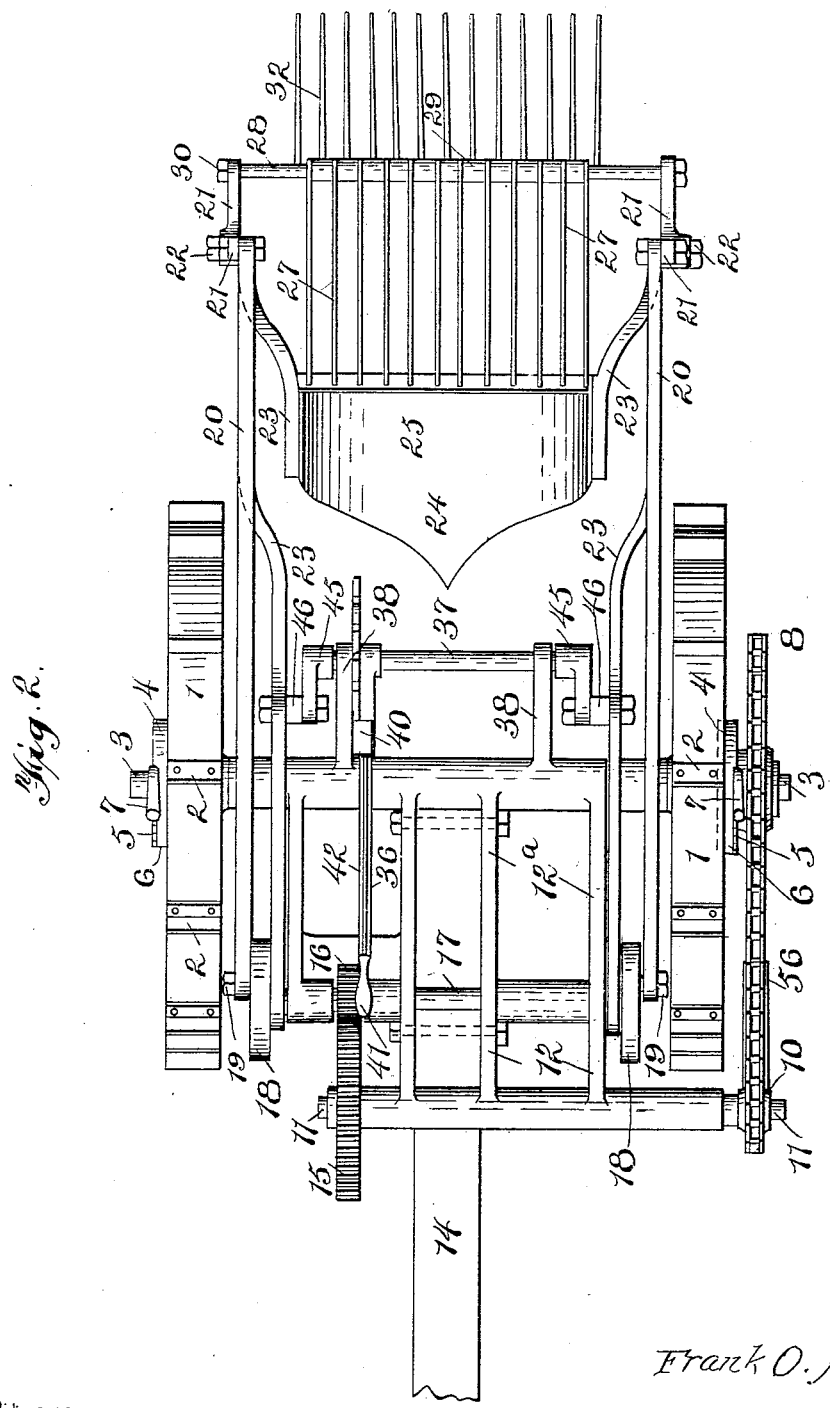

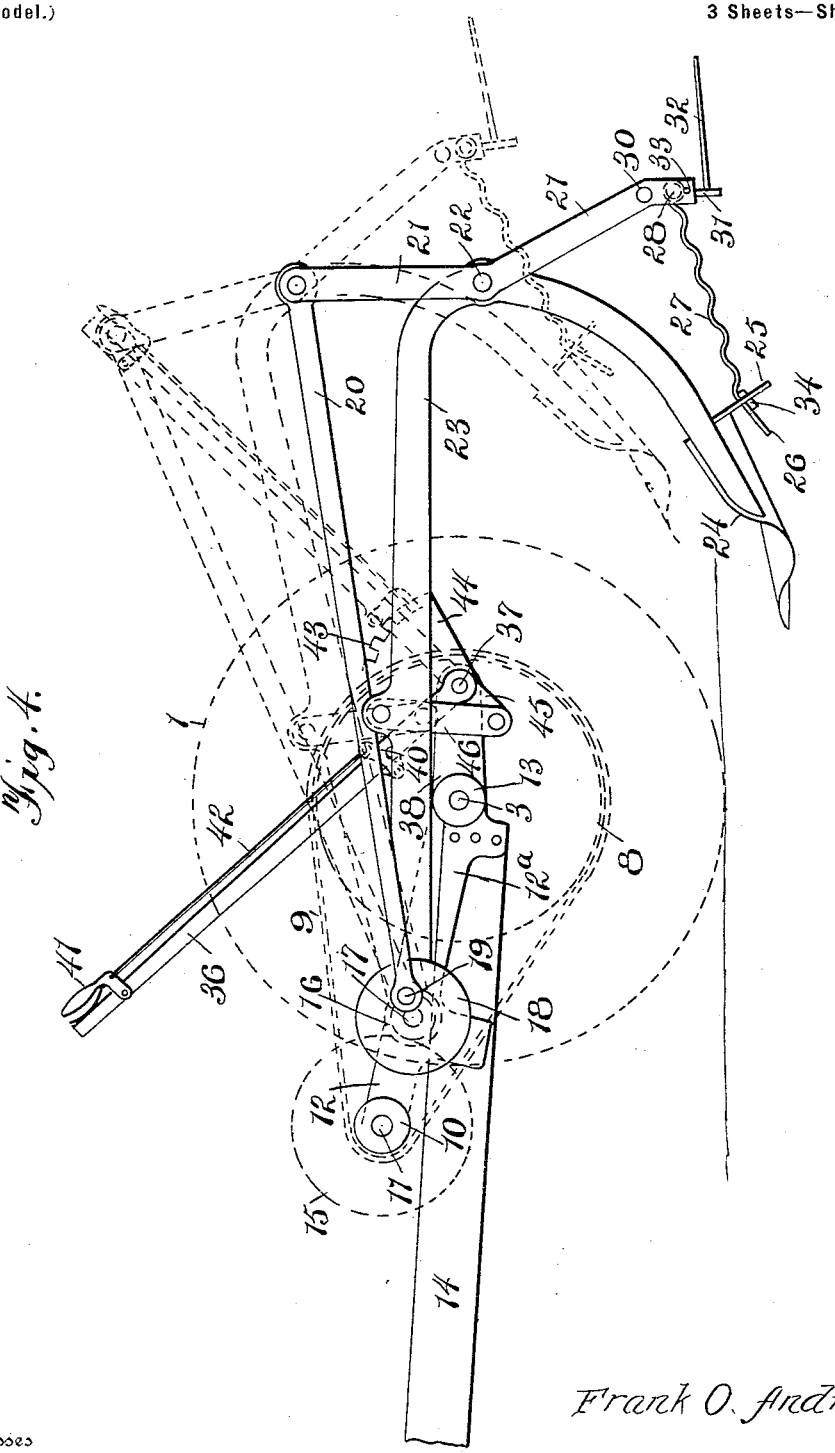

UNITED STATES PATENT OFFICE.

FRANK OSMUND ANDREWS, OF CHRISTCHURCH, NEW ZEALAND.

POTATO-DIGGING MACHINE.

SPECIFICATION forming part of Letters Patent No. 704,169, dated July 8, 1902.

Application filed October 25, 1901. Serial No. 80,007. (No model.)

*To all whom it may concern:*

Be it known that I, FRANK OSMUND ANDREWS, a subject of His Majesty the King of Great Britain and Ireland, residing at South Belt, Christchurch, in the Colony of New Zealand, have invented a new and useful Improved Potato-Digging Machine and Cultivator, of which the following is a specification.

My invention relates to the class of machines employed for raising potatoes out of the ground and separating them from the soil, and includes several improvements which can be applied to the art generally and also the combination of these improvements with parts known in the art whereby is produced a complete machine. In addition to its use for digging potatoes the machine can be employed very effectively and without alteration as a cultivator for shaking up the soil and removing weeds.

In describing the operation of the machine I shall for convenience assume it used for digging potatoes.

Broadly described, my machine consists of a frame supported between a pair of traveling wheels, to which is pivotally attached a pair of beams carrying a share in the form of a scoop, the forward part of said share being designed to penetrate the earth beneath the potatoes and raise them, with nearly the whole of the soil and weeds, to the width of the scoop to an inclined grid formed of corrugated bars which has a vibratory or what I term "jigging" motion imparted to it, by which the greater part of the soil is caused to fall between the bars, while the weeds and potatoes travel up them and are delivered upon the surface of the land.

Means are provided for adjusting the depth at which the share-scoop works beneath the surface and for raising it from the ground for traveling purposes.

In the drawings which form a part of this specification, Figure 1 is a side elevation, and Fig. 2 a plan, of complete machine; Fig. 3, a sectional elevation of a detail; Fig. 4, a side elevation illustrating diagrammatically means for raising the share.

The same numerals of reference indicate the same parts throughout the figures.

The traveling wheels 1 have tread-plates 2 upon their circumferences to prevent skidding and are mounted loosely upon an axle 3. Each end of this axle has a ratchet 4 fixed upon it, and a pawl 5, pivoted in a bracket upon the boss of the wheel 1, is normally held in engagement with the ratchet-teeth by a bow-spring 6, but may be moved out of engagement with the teeth by a hand-lever 7, with which it is integral. Forward motion of either of the traveling wheels when the pawl upon it is in engagement with its ratchet revolves the axle, while rearward motion of the wheel has no effect thereon. A sprocket-wheel 8, fixed upon the axle 3, is geared by a chain 9 with a sprocket-pinion 10, fixed upon a spindle 11, journaled in a bracket 12 of the frame $12^a$, which is made integral with a long sleeve 13, through which axle 3 passes. The frame $12^a$ has a recess in which is fitted and secured the end of the pole 14 of the implement. Upon spindle 11 is fixed a spur-wheel 15, which gears with a spur-pinion 16 upon a spindle 17, journaled in bearings formed upon a frame $12^a$ and carrying the disks 18, one at each end, each disk carrying a crank-pin 19. Connecting-rods 20 connect the crank-pins with the upper ends of levers 21, one upon each side of the implement. The levers 21 are pivoted by pivot-bolts 22 upon the respective beams 23, which beams at their forward ends are pivoted upon the bearings of spindle 17 concentrically with said spindle and at their curved rear ends are fixed one upon each side of the share-scoop 24. Share-scoop 24 is concave and is pointed at its forward end and has a downwardly-projecting flange 25 extending along its rear end, which is pierced to receive the plain ends 26 of the grid or jigger bars 27, which are inclined rearwardly upward and have eyes at their rear ends threaded upon a bar 28, spacing sleeves or thimbles 29 being interposed between the eyes upon the bar. The grid-bars are corrugated, as I have found the potatoes and weeds travel up them better than when they are plain. The plain ends of the bars which pass through the holes in the share-scoop are bent downward, the effect being that the bars remain nearly parallel throughout their movement. Bar 28 is bent downwardly to approximate the curve of the share-scoop and is secured to and between the levers 21, its screw-threaded ends passing each through one of the levers and being clamped thereto by nuts 30. The angle between the levers 21 and the grid-bars should be less than a right angle to secure the most effective result in causing the potatoes and weeds to travel up the grid. A wearing-piece or bush 34 (see Fig. 3) is employed beneath each grid-bar in the flange 25. The wearing-pieces are inserted in the holes in the flange 25 before the bars are put in, the flanges 35 preventing them from coming out when the bars are in position. A bar 31, having projecting tines 32, is also secured at its ends to the levers 21 by bolts 33 and is readily removable. A hand-lever 36 is fixed upon a rocking shaft 37, mounted in bracket-arms 38, projecting from frame 12$^a$, said hand-lever being locked in desired position by a keep 40, operable by a lever 41 through the rod 42 and engaging in one or other of the notches 43 in the fixed quadrant 44. Rocking shaft 37 has levers 45, one at each end, and links 46, pivoted at each end, connect said levers with the beams 23, the effect being that when the hand-lever 36 is operated the driving mechanism is moved through an arc the axis of which is represented by the center of the axle 3, and the beams are raised or lowered, as the case may be. The details of this part of the machine will be clearly gathered from Fig. 4, which shows the beams in their highest position in dotted and their lowest position in full lines.

The slack of sprocket-chain 9 is taken up by a spring-plate 56, which is adjustably secured to an extension from bracket 12 of the frame 12$^a$ by a bolt 57 passing through a slot therein.

In operation the share-scoop is adjusted by operating the hand-lever to the depth required to pass beneath the potatoes, and the machine is drawn over the land, with the wheels upon each side of the potato-row. The revolution of the traveling wheels gives motion to the gearing and rapid vibratory or jigging motion is imparted to the grid-bars up which weeds and potatoes pass until they are delivered upon the tines 32 and ultimately fall upon the top of the soil which has fallen through the grid.

The tines 32 are only required when soil is inclined to adhere to the potatoes, when it has some effect in separating it therefrom.

When employed as a cultivator only, the action of the machine is as previously described, the soil being thoroughly shaken up by the action of the grid-bars and weeds being shaken free of soil and left upon the surface.

What I claim as my invention, and desire to secure by Letters Patent, is—

1. In a machine for the purpose indicated the combination of a share-scoop arranged between and fixed to a pair of beams one upon each side of the implement said beams being pivotally supported at their forward ends upon a spindle journaled in a bracket carried upon the axle of a pair of traveling wheels, a grid consisting of a plurality of bars, each bar having a plain portion at one end, which works in a hole formed for its reception in the share-scoop, and an eye at the other end which is threaded upon a bar, said bar being connected to and extending between a pair of levers which are pivoted one upon each beam a rod connecting each lever with a crank-pin carried by a crank-disk the spindle of said crank-disks being journaled in bearings upon which the beams are pivoted, and means for imparting motion to said crank by the forward movement of the implement whereby jigging motion is communicated to said grid as specified.

2. In a machine for the purpose indicated the combination with a share-scoop having a downwardly-projecting flange along its rear end, of a grid formed of bars the upper rear ends of which are threaded upon a bar which is carried between pivoted levers, the lower end of each grid-bar passing through a hole in said flange and means for vibrating said levers whereby jigging motion is communicated to said grid as specified.

In witness whereof I have hereunto set my hand in presence of two witnesses.

FRANK OSMUND ANDREWS.

Witnesses:
HARIETT RAYWARD,
E. J. ANSTISS.